United States Patent
Kern et al.

(10) Patent No.: US 7,954,382 B2
(45) Date of Patent: Jun. 7, 2011

(54) PRESSURE-MEASURING DEVICE

(75) Inventors: Christoph Kern, Aspach (DE); Ewgenij Landes, Remseck (DE); Reiko Zach, Remseck (DE); Michael Schuettoff, Deckenpfronn (DE); Michael Kleindl, Schwieberdingen (DE); Christian Doering, Stuttgart (DE); Steffen Schott, Schwieberdingen (DE); Pavlo Saltikov, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 12/304,925

(22) PCT Filed: Oct. 16, 2007

(86) PCT No.: PCT/EP2007/061021
§ 371 (c)(1),
(2), (4) Date: Sep. 23, 2009

(87) PCT Pub. No.: WO2008/068101
PCT Pub. Date: Jun. 12, 2008

(65) Prior Publication Data
US 2010/0037698 A1 Feb. 18, 2010

(30) Foreign Application Priority Data
Dec. 5, 2006 (DE) .......................... 10 2006 057 627

(51) Int. Cl.
*G01L 7/08* (2006.01)
*G01L 23/22* (2006.01)
(52) U.S. Cl. ........................................ 73/715; 73/35.12
(58) Field of Classification Search .................. None
See application file for complete search history.

(56) References Cited

U.S. PATENT DOCUMENTS
3,673,443 A 6/1972 Siegel
(Continued)

FOREIGN PATENT DOCUMENTS
CH 537013 5/1973
(Continued)

OTHER PUBLICATIONS
International Search Report, PCT International Patent Application No. PCT/EP2007/061021, dated Mar. 5, 2008.

*Primary Examiner* — Andre J Allen
(74) *Attorney, Agent, or Firm* — Kenyon & Kenyon LLP

(57) ABSTRACT

A pressure-measuring device is situated in a chamber of an internal combustion engine. The pressure-measuring device has a housing, a force-transmitting element that protrudes partly from the housing at a chamber-side opening of the housing, and a pressure sensor that is situated in an interior space of the housing. The pressure sensor stands in effective connection to the force-transmitting element. In addition, a diaphragm is provided that seals the interior space of the housing, in which the pressure sensor is situated, against the chamber-side opening. The diaphragm, which is preferably fashioned as a metal diaphragm, has a force-transmitting segment that is oriented in an axial direction of the force-transmitting element. Moreover, the pressure sensor stands in effective connection with the force-transmitting element via the force-transmitting segment of the diaphragm. In this way, there takes place at least a partial compensation of thermally caused changes in length of the diaphragm, caused for example by hot combustion gases, and resulting in periodic impairments of the pressure measurement made by the pressure sensor.

12 Claims, 2 Drawing Sheets

U.S. PATENT DOCUMENTS

| | | | |
|---|---|---|---|
| 3,857,287 A | 12/1974 | Sonderegger et al. | |
| 2005/0252297 A1* | 11/2005 | Heinzelmann et al. | 73/708 |
| 2006/0053875 A1* | 3/2006 | Haussner et al. | 73/116 |
| 2007/0245805 A1* | 10/2007 | Schricker et al. | 73/35.12 |
| 2007/0245806 A1* | 10/2007 | Hirose et al. | 73/35.13 |
| 2008/0223139 A1* | 9/2008 | Hirose et al. | 73/715 |
| 2009/0242540 A1* | 10/2009 | Itoh et al. | 219/267 |
| 2009/0314061 A1* | 12/2009 | Kern et al. | 73/35.12 |
| 2009/0320576 A1* | 12/2009 | Borgers et al. | 73/114.18 |
| 2010/0147822 A1* | 6/2010 | Burrows et al. | 219/267 |

FOREIGN PATENT DOCUMENTS

| | | |
|---|---|---|
| WO | WO 2006/072514 | 7/2006 |
| WO | WO 2006/108939 | 10/2006 |

\* cited by examiner

PRESSURE-MEASURING DEVICE

FIELD OF THE INVENTION

The present invention relates to a pressure-measuring device to be situated in a chamber of an internal combustion engine. Specifically, the present invention relates to a pressure-measuring glow plug for disposition in a pre-chamber, turbulence chamber, or combustion chamber of an air-compressing, self-igniting internal combustion engine.

BACKGROUND INFORMATION

International Patent Application No. WO 2006/072514 A1 describes a pencil-type glow plug has an integrated pressure sensor. The pressure sensor in the conventional pencil-type glow plug is connected to a rod-shaped heating element that is accommodated in movable fashion in the interior of the pencil-type glow plug. A steel diaphragm having a radially symmetrical construction is allocated to the rod-shaped heating element; said steel diaphragm shields a force-measuring element of the combustion chamber pressure sensor against combustion gases, and has a spring elasticity that is a function of its geometry.

The pencil-type glow plug described in International Patent Application No. WO 2006/072514 A1 has the disadvantage that the hot combustion gases that occur during each working cycle cause a heating of the steel diaphragm, followed by a cooling of the steel diaphragm, so that the pressure measurement is impaired due to thermal changes in length of the steel diaphragm. Specifically, the conventional pencil-type glow plug having the integrated pressure sensor has the disadvantage that a distortion of the outputted pressure signal occurs.

SUMMARY

An example pressure-measuring device according to the present invention may have the advantage that the precision of the pressure measurement is improved, and in particular distortions of the outputted pressure signal are reduced.

Generally, the action of pressure on the force-transmitting element, or on another element connected to the force-transmitting element, of the pressure-measuring device causes a linear-elastic compression of the components situated in the force path. In this way, a force impulse can be transmitted that correlates with a pressure in the combustion chamber, i.e., the combustion chamber pressure. One acquisition possibility here is for a force-measuring module that comprises the pressure sensor and is pre-tensioned in the force path to acquire the force impulses from the force-transmitting element.

The diaphragm, which can be fashioned as a metal diaphragm, in particular a steel diaphragm, seals the interior of the housing, in which the pressure sensor is situated, against the chamber-side opening, so that hot combustion gases penetrating into the housing via the chamber-side opening do not reach the pressure sensor or other elements of the pencil-type glow plug. However, a certain thermal shock sensitivity can result from the diaphragm. Due to its thin-walled construction, the diaphragm has relatively low mass, so that the hot combustion chamber gases cause rapid heating of the metal diaphragm. Cooling of the diaphragm also takes place with corresponding quickness, because this diaphragm is mechanically connected for example to the force-transmitting segment, to a housing part, or the like. In normal operation, such heating and cooling of the diaphragm takes place during each working cycle, i.e., approximately 50 times per second. The thermal changes in length that are caused by this can cause periodic changes in the pre-tension of the force-measuring module. In particular, during the heating of the diaphragm a certain relaxation can take place in the pre-tensioned force-measuring module, so that a pressure measurement is temporarily not possible, resulting in a distortion of the pressure measurement signal.

Due to the disposition of the force-transmitting segment of the diaphragm in the force path, the force-transmitting segment being oriented in the axial direction of the force-transmitting element, and thus in the direction of the action of the force, the thermal influence on the pressure measurement signal is reduced, and may be at least largely canceled. Specifically, a change in length of the force-transmitting segment of the diaphragm will be expressed only as a certain relative displacement of the force-transmitting element that is not significant for the pressure measurement, and not as a relaxation or additional pre-tension of the pressure sensor.

This results in the advantage that the pressure-measuring device is suitable for use in high-precision injection systems in which, in order to control a homogenous combustion in the combustion chamber, which is very sensitive to the quantity of fuel and the time of the injection, the surface under the combustion curve, and thus the combustion heat, is inferred from the curve of the pressure signal. Moreover, the pressure-measuring device can advantageously be used in a research laboratory in order to enable monitoring of the combustion chamber pressure over the entire working cycle during trials of new engines.

Advantageously, the diaphragm has a radial segment that is oriented generally perpendicular to the axial direction. This enables an advantageous elastic compression of the diaphragm.

It is advantageous if the diaphragm has a fastening segment that is connected to the force-transmitting segment via the radial segment, and if the diaphragm is connected at least indirectly to the housing at the fastening segment. Here, the diaphragm can be connected at the fastening segment to a sensor cage, or can be connected directly to the housing. The connection can be formed for example by welding, in particular laser welding. The connection of the fastening segment to the housing provides the advantage that an optimized construction of the fastening segment is enabled with respect to the connecting method. For example, the fastening segment can have a relatively large wall thickness in order to enable a reliable connection. In addition, the fastening segment can have a certain extension, in particular in the axial direction, in order to enable a larger tolerance for the positioning of the connection or connecting points.

Advantageously, the diaphragm may be connected at least indirectly to the housing at the radial segment. Here, the diaphragm can be connected to the sensor cage at the radial segment. This has the advantage that the portion of the temperature-caused change in length of the diaphragm that has an effect on the pressure measurement can be largely reduced or even completely eliminated. For special applications, in particular laboratory applications, this can further improve the precision of the pressure measurement. Depending on the case of application, this may justify the somewhat greater expense involved in the fastening of the diaphragm to the housing, compared to the embodiment having a fastening segment.

Advantageously, one end of the radial segment goes over into an end of the force-transmitting segment, so that the diaphragm is fashioned approximately in the form of a sleeve that widens radially in the radial segment.

It is also advantageous if one end of the radial segment goes over into a central part of the force-transmitting segment. This has the advantage that the portion of a thermal change in length of the diaphragm that influences the pressure measurement can be greatly reduced or even completely eliminated, making it possible to carry out an adjustment via the design of the force-transmitting segment. These advantages are found in particular in combination with a fastening segment at which the metal diaphragm is connected to a housing or the like.

BRIEF DESCRIPTION OF THE DRAWINGS

Preferred exemplary embodiments of the present invention are explained in more detail in the description below with reference to the figures, in which corresponding elements have been provided with the same reference characters.

DETAILED DESCRIPTION OF EXAMPLE EMBODIMENTS

Figure 1:
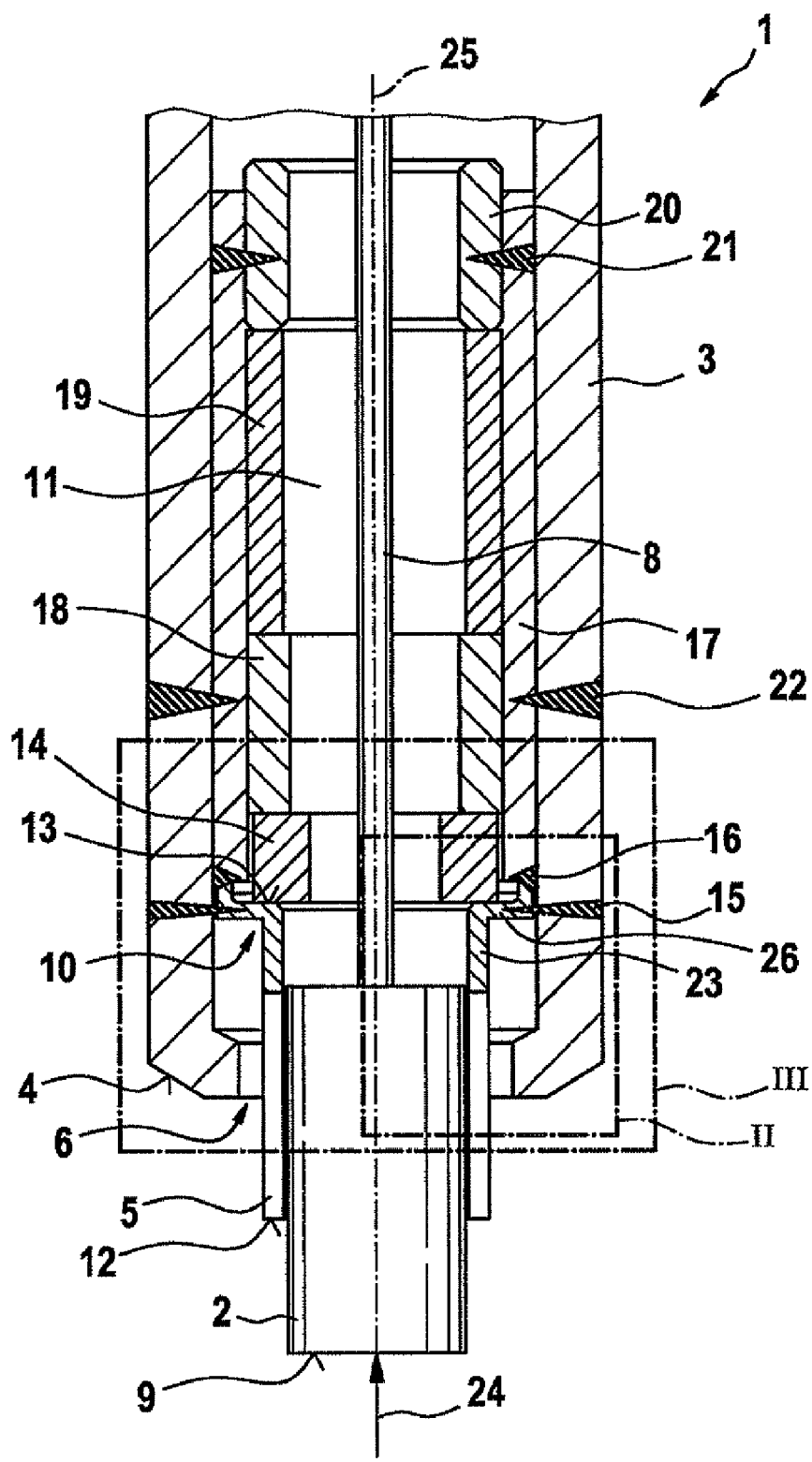
FIG. 1 shows a first exemplary embodiment of a pressure-measuring device according to the present invention, in a schematic, partly sectional representation.

FIG. 1 shows a first exemplary embodiment of a pressure-measuring device 1, in a schematic, axial sectional representation. Pressure-measuring device 1 is realized as pressure-measuring glow plug 1 for an air-compressing, self-igniting internal combustion engine. In pre-chamber and turbulence chamber engines, a rod-shaped heating element 2 of pressure-measuring glow plug 1 protrudes into the chamber of the internal combustion engine, and in engines having direct injection said heating element protrudes into a combustion chamber of the engine. However, pressure-measuring glow plug 1 according to the present invention is also suitable for other cases of application. In addition, pressure-measuring device 1 can also be realized as a pressure-measuring spark plug or as a pressure-measuring injection valve for mixture-compressing, externally ignited internal combustion engines.

Pressure-measuring glow plug 1 has a housing 3 that has a sealing cone 4. Rod-shaped heating element 2 is surrounded in some sections by a force-transmitting element 5, and is connected thereto. Housing 3 has a chamber-side opening 6 at which heating element 2, surrounded by force-transmitting element 5, protrudes from housing 3. In this exemplary embodiment, force-transmitting element 5 is fashioned as a support tube for heating element 2. However, force-transmitting element 5 can also be part of heating element 2, for example given a heating element 2 that has a metallic heating tube having an internally situated heating coil.

Rod-shaped heating element 2 is connected to a glow current line 8 that is capable of being suitably connected to a control device or the like. In addition, heating element 2 is electrically contacted directly or indirectly to housing 3, so that in the installed state of pressure-measuring glow plug 1 a connection to electrical ground 9 can be created via housing 3. Relatively large currents, for example several amperes, can flow through glow current line 8 in order to supply heating element 2 with the energy required for its heating. The heating preferably takes place in the area of a glow tip 9 of heating element 2.

Inside housing 3, a metal diaphragm 10 is provided that seals an interior space 11 of housing 3 against chamber-side opening 6. The seal prevents hot combustion gases that penetrate into housing 3 via chamber-side opening 6 from entering interior space 11. On one end, metal diaphragm 10 has a first contact surface 12 at which force-transmitting element 5 contacts metal diaphragm 10. In addition, metal diaphragm 10 has a second contact surface 13 with which a first force-transmitting sleeve 14 is in contact. Moreover, metal diaphragm 10 is connected to housing 3 by a weld seam 15 that can be for example fashioned through laser welding. Moreover, metal diaphragm 10 is connected to a sensor cage 17 by an additional weld seam 16 that can likewise be fashioned through laser welding. First force-transmitting sleeve 14 is situated at least generally inside sensor cage 17. In addition, a second force-transmitting sleeve 18 that is in contact with first force-transmitting sleeve 14 is situated inside sensor cage 17. Moreover, a pressure sensor 19 is situated inside sensor cage 17. Pressure sensor 19 on the one hand is in contact with second force-transmitting sleeve 18. In addition, pressure sensor 19 is supported on a fixing element 20 that is connected to sensor cage 17 by a weld seam 21. Sensor cage 17 is connected to housing 3 by an additional weld seam 22. Weld seam 22 may also be omitted if warranted.

Pressure sensor 19 is effectively connected to force-transmitting element 5 via second force-transmitting sleeve 18, first force-transmitting sleeve 14, and a force-transmitting segment 23 of metal diaphragm 10. The two contact surfaces 12, 13, which face away from one another, are fashioned on the ends of force-transmitting segment 23 of metal diaphragm 10. A pressure in the combustion chamber, i.e., in the chamber of the internal combustion engine, results in a force 24, relative to the surface of glow tip 9, in the direction of an axis 25 of force-transmitting element 5, said force being directed against pressure sensor 19. Pressure sensor 19 is preferably mounted inside sensor cage 17 in such a way that a certain pre-tension of pressure sensor 19 exists in the pressureless state, i.e., when force 24 is not present. Force 24 strengthens this pre-tension, so that the momentary pressure in the chamber of the internal combustion engine can be determined from the resulting load on pressure sensor 19. A heating of metal diaphragm 10 that can be caused by hot combustion gases penetrating into housing 3 via opening 6 causes a certain thermal change in length of force-transmitting segment 23 of metal diaphragm 10. This change in length of force-transmitting segment 23 is expressed as a certain displacement of force-transmitting element 5 in the axial direction, i.e. along axis 25. However, the position of second contact surface 13 of force-transmitting segment 23 of metal diaphragm 10 is not affected by this change in length, so that the loading on pressure sensor 19, and thus also the pressure measurement, is not influenced.

Moreover, metal diaphragm 10 has a radial segment 26 that is oriented at least essentially perpendicular to the axial direction, i.e., perpendicular to axis 25. A thermal expansion of radial segment 26 does not have an effect on the axial position of second contact surface 13, so that here as well there is no influence on the pressure measurement of pressure sensor 19. In the exemplary embodiment shown in FIG. 1, the fastening of metal diaphragm 10 to housing 3 takes place directly at radial segment 26. Thermally caused changes in length in metal diaphragm 10 thus have no effect, or no significant effect, on the pressure measurement. In this way, a very high degree of precision in the pressure measurement, in particular a distortion-free pressure measurement, can be achieved by pressure sensor 19.

Figure 2:
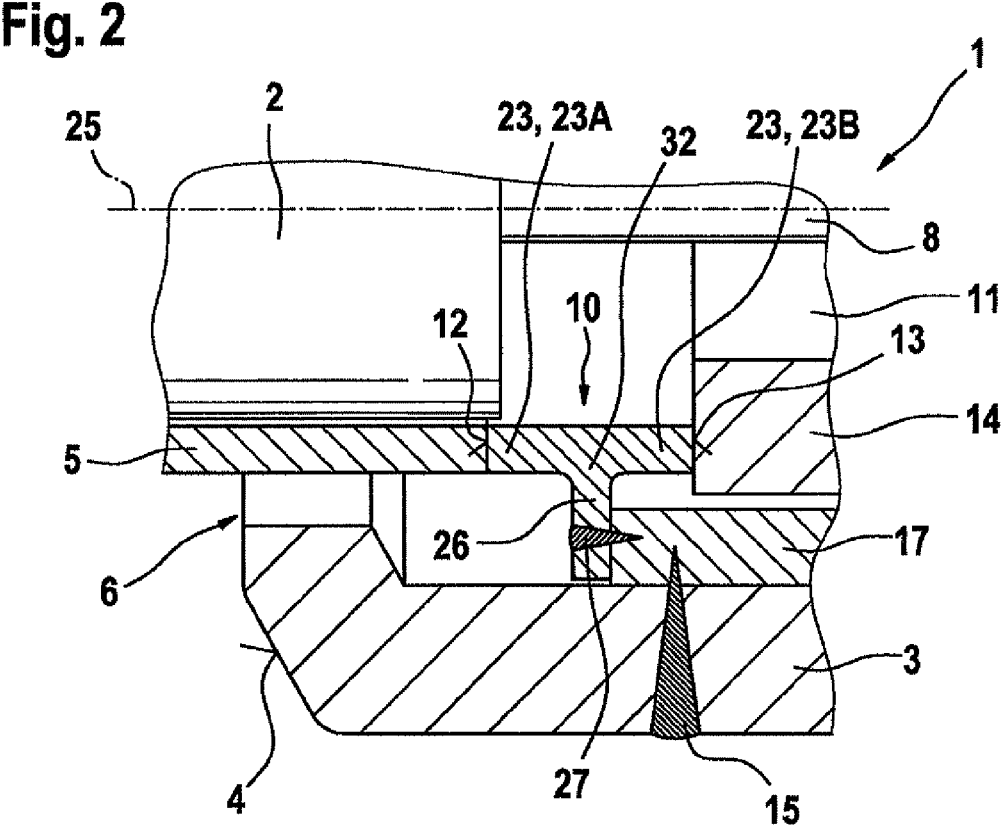
FIG. 2 shows the section designated II in FIG. 1 of a pressure-measuring device, corresponding to a second exemplary embodiment of the present invention.

FIG. 2 shows the segment designated II in FIG. 1 of a pressure-measuring device realized as a pressure-measuring glow plug 1, corresponding to a second exemplary embodiment of the present invention. In this exemplary embodiment, metal diaphragm 10 has a force-transmitting segment 23 made up of subparts 23A, 23B. First contact surface 12 is fashioned on first subpart 23A, and contact surface 13 is fashioned on second subpart 23B of force-transmitting segment 23. This results in a generally T-shaped profile of metal diaphragm 10, which has a radially symmetrical construction. The fastening of metal diaphragm 10 to sensor cage 17 takes place via a weld seam 27. In addition, sensor cage 17 is connected to housing 3 by weld seam 15. Subpart 23B of force-transmitting segment 23 is not situated in the path of heat conduction from metal diaphragm 10 to sensor cage 17, or housing 3. Thus, short-term periodic heatings and coolings do not take place in the area of subpart 23B of force-transmitting segment 23, so that the functioning of the pressure measurement is not adversely affected. The fastening of metal diaphragm 10 to sensor cage 17 at its radial segment 26 means that no, or only generally negligible, thermal changes in length that could have an unfavorable effect on the pressure measurement take place in the direction of axis 25. Thus, a high degree of precision is achieved in the pressure measurement.

Figure 3:
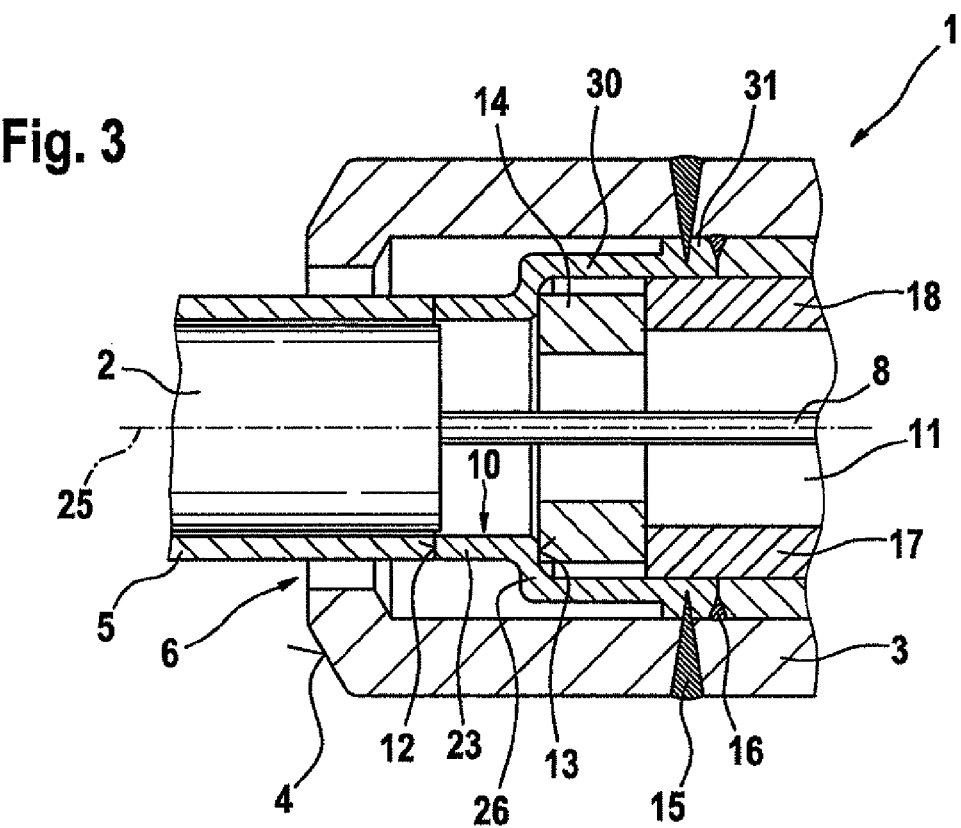
FIG. 3 shows the segment designated III in FIG. 1 of a pressure-measuring device, corresponding to a third exemplary embodiment of the present invention.

FIG. 3 shows the segment designated III in FIG. 1 of a pressure-measuring device fashioned as a pressure-measuring glow plug 1, corresponding to a third exemplary embodiment of the present invention. In this exemplary embodiment, metal diaphragm 10 has a fastening segment 30 that is connected to force-transmitting segment 23 via radial segment 26. Fastening segment 30 is routed at least essentially in the axial direction along axis 25. In addition, the length of metal diaphragm 10 in the axial direction and the length of fastening segment 30 in the axial direction along axis 25 add up at least essentially to the overall length of metal diaphragm 10 in the axial direction. Due to the effect of the hot combustion gases or the like, there is a periodic heating and cooling of metal diaphragm 10, resulting in thermally caused changes in length. Changes in the length of force-transmitting segment 23 of metal diaphragm 10 do not have an effect on the pre-tension of pressure sensor 19. The thermal changes in length of fastening segment 30 in the axial direction result in a certain periodic relaxation of the pre-tension of pressure sensor 19. However, the overall periodic relaxation of pressure sensor 19 due to the thermal changes of length of metal diaphragm 10 in the axial direction is reduced, because only the length of fastening segment 30 causes relaxations that are significant for the pressure measurement. Fastening segment 30 has a part 31 that has a greater wall thickness, in order to ensure sufficient thickness of the metal diaphragm for the weld pool backing during laser welding. Moreover, via the extension of part 31 in the axial direction a certain tolerance can be ensured for the positioning of the weld seam, in order to facilitate the manufacture of pressure-measuring glow plug 1, in particular in the context of mass production. The length of fastening segment 30 in the axial direction is preferably as short as possible.

Pressure-measuring devices 1 shown in FIGS. 1 to 3 illustrate examples of possible realizations of the present invention. In particular, the wall thickness of metal diaphragm 10 can be adapted to the particular case of application, and can also vary. In particular, the wall thickness of metal diaphragm 10 can be made relatively thin in areas where a certain degree of flexibility of metal diaphragm 10 is desired, in particular in the area of the transitions between force-transmitting segment 23 and radial segment 26, and between radial segment 26 and fastening segment 30. In additions metal diaphragm 10 can also have an L-shaped construction. The manufacture of metal diaphragm 10 can for example take place through turning of a material made of high-strength steel. The metal diaphragm can for example have a wall thickness of 0.3 mm. Pressure-measuring device 1 according to the present invention enables in particular a reduction in exhaust gas values. Specifically, certain thermodynamic conversion points can be determined at which the converted quantity of heat is 5%, 50%, or 95%. Such a value can for example be determined in the new state. Then, after a certain total runtime, a control device can carry out a monitoring, and control parameters can be modified as a function of the determined value. In order to determine the peak pressure, it is necessary to determine the overall curve of the pressure over a working cycle. From this pressure curve, the converted quantity of heat can be inferred. For example, the degree of rotation of the crankshaft can be determined at which the converted quantity of heat is 50%. The injected quantity and/or the time of injection can then be adjusted as a function of the degree of rotation of the crankshaft determined in the new state, or in some other reference state.

In addition, an equilibration [or: equalization] of moments can also be carried out with reference to a plurality of cylinders of the internal combustion engine. This equilibration can be controlled via the average combustion pressure, and the precision of the equilibration can also be increased due to the higher precision of the pressure measurement enabled by the present invention.

In the exemplary embodiment shown in FIG. 2, radial segment 26 goes over into a central part 32 of force-transmitting segment 23. Subparts 23A and 23B of force-transmitting segment 23 can also differ in their construction, having in particular different lengths.

The present invention is not limited to the described exemplary embodiments.

What is claimed is:

1. A pressure-measuring glow plug for an air-compressing, self-igniting internal combustion engine, comprising:
    a housing;
    a force-transmitting element that protrudes at least partly from the housing at a chamber-side opening of the housing;
    a pressure sensor that is situated in an interior space of the housing, the pressure sensor standing in effective connection with the force-transmitting element; and
    a diaphragm that seals the interior space of the housing in which the pressure sensor is situated against the chamber-side opening, wherein the diaphragm has a force-transmitting segment that is oriented at least generally in an axial direction of the force-transmitting element, and the pressure sensor stands in effective connection with the force-transmitting element at least via the force-transmitting segment of the diaphragm.

2. The pressure-measuring device as recited in claim 1, wherein the diaphragm has a radial segment that is oriented at least generally perpendicular to the axial direction.

3. The pressure-measuring device as recited in claim 2, wherein the diaphragm has a fastening segment that is connected to the force-transmitting segment via the radial segment, and the diaphragm is connected at least indirectly to the housing at the fastening segment.

4. The pressure-measuring device as recited in claim 3, wherein the diaphragm is connected to a sensor cage at the fastening segment.

5. The pressure-measuring device as recited in claim 4 wherein the diaphragm is connected at least indirectly to the housing at the radial segment.

6. The pressure-measuring device as recited in claim 5, wherein the diaphragm is connected to the sensor cage at the radial segment.

7. The pressure-measuring device as recited in claim 2, wherein one end of the radial segment goes over into an end of the force-transmitting segment.

8. The pressure-measuring device as recited in claim 2, wherein one end of the radial segment goes over into a central part of the force-transmitting segment.

9. The pressure-measuring device as recited in claim 1, wherein the force-transmitting segment has a first contact surface at which the force-transmitting element contacts the diaphragm, and a second contact surface that faces away from the first contact surface, and wherein a transmission of force to the pressure sensor takes place via the second contact surface.

10. The pressure-measuring device as recited in claim 9, wherein at least one force-transmitting element is provided that on the one hand contacts the second contact surface of the diaphragm, and on the other hand stands in effective connection with the pressure sensor.

11. The pressure-measuring device as recited in claim 1, wherein the diaphragm is fashioned by turning.

12. The pressure-measuring device as recited in claim 1, wherein the diaphragm is fashioned a metal diaphragm.

* * * * *